(12) United States Patent  (10) Patent No.: US 9,165,017 B2
Jackson  (45) Date of Patent: Oct. 20, 2015

(54) RETRIEVING IMAGES

(75) Inventor: Dean K. Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 13/248,419

(22) Filed: Sep. 29, 2011

(65) Prior Publication Data

US 2013/0083977 A1  Apr. 4, 2013

(51) Int. Cl.
G06K 9/00 (2006.01)
G06F 17/30 (2006.01)

(52) U.S. Cl.
CPC .................. G06F 17/30265 (2013.01)

(58) Field of Classification Search
None
See application file for complete search history.

(56) References Cited

U.S. PATENT DOCUMENTS

| 7,574,661 | B2 * | 8/2009 | Matsuura et al. | 715/745 |
| 7,778,438 | B2 * | 8/2010 | Malone | 382/100 |
| 8,035,838 | B2 * | 10/2011 | Ohtuka | 358/1.15 |
| 8,345,118 | B2 * | 1/2013 | Matsushita et al. | 348/222.1 |
| 8,509,477 | B2 * | 8/2013 | Malone | 382/100 |
| 2003/0051207 | A1 * | 3/2003 | Kobayashi et al. | 715/500 |
| 2004/0158371 | A1 * | 8/2004 | Iggulden et al. | 701/29 |
| 2005/0034084 | A1 * | 2/2005 | Ohtsuki et al. | 715/864 |
| 2005/0250548 | A1 * | 11/2005 | White | 455/566 |
| 2006/0271593 | A1 * | 11/2006 | De Mes et al. | 707/104.1 |
| 2009/0044128 | A1 * | 2/2009 | Baumgarten et al. | 715/738 |
| 2009/0083236 | A1 * | 3/2009 | Shuster | 707/3 |
| 2010/0046842 | A1 * | 2/2010 | Conwell | 382/218 |
| 2010/0095009 | A1 * | 4/2010 | Matuszewski et al. | 709/228 |
| 2011/0207480 | A1 * | 8/2011 | Friedmann | 455/457 |
| 2011/0212717 | A1 * | 9/2011 | Rhoads et al. | 455/420 |
| 2012/0162249 | A1 * | 6/2012 | Tsuda et al. | 345/629 |
| 2012/0220317 | A1 * | 8/2012 | Hollis et al. | 455/457 |

FOREIGN PATENT DOCUMENTS

WO  2005/029361 A1  3/2005

OTHER PUBLICATIONS

Performing a check-in: Emerging Practices, Norms and Conflicts in Location—Sharing Using Foursquare, by Cramer et al., Sep. 2011.*
Examination Report for AU Application No. 2012315997 dated Nov. 18, 2014.

* cited by examiner

Primary Examiner — Vikkram Bali

(57) ABSTRACT

A system includes: receiving first information about a device, where the first information includes data corresponding to a location of the device and a time at which the device was at the location; identifying one or more images associated with second information that is within a range of the first information, where the second information for an image includes data corresponding to a location at which the image was captured and a time at which the image was captured, and where the location at which the image was captured and a time at which the image was captured are within a range of the location of the device and the time at which the device was at the location; and retrieving the one or more images associated with the second information.

20 Claims, 4 Drawing Sheets

RETRIEVING IMAGES

BACKGROUND

This disclosure relates generally to retrieving images based on, for example, metadata that specifies where and when the images were captured.

An image capturing device, e.g., a digital camera, typically associates metadata with its captured images. In an example, this metadata may identify a device that captured an image. The metadata may also specify the time at which the image was captured and the location, e.g., geographic coordinates, at which the image was captured. Images stored on a network, e.g., the Internet, may be tagged with this type of metadata.

Some computing devices, e.g., a cellular telephone, may have a feature that, if activated by a user, records the location of the device (e.g., in geographic coordinates) at specified time intervals. The resulting information may be stored in a log file on the device, and accessed by the user, as needed.

SUMMARY

A system for retrieving images may include receiving first information about a device, where the first information includes data corresponding to a location of the device and a time at which the device was at the location; identifying one or more images associated with second information that is within a range of the first information, where the second information for an image includes data corresponding to a location at which the image was captured and a time at which the image was captured, and where the location at which the image was captured and the time at which the image was captured are within a range of the location of the device and the time at which the device was at the location; and retrieving the one or more images associated with the second information. The features described herein, or portions thereof, may be incorporated into the foregoing system, examples of which are as follows.

Identifying the one or more images may include performing a search of one or more servers on the network using the first information to locate the second information. The images may be retrieved from the one or more servers The first information may be part of a log file received from the device.

The system may include receiving a sample image; and comparing the sample image to the one or more retrieved images. The system may include performing a facial recognition process on the one or more retrieved images to identify a subject appearing in the one or more retrieved images.

The first information may include geographic coordinates of the device, the second information may include geographic coordinates at which the image was captured, and the range may be a geographic area that encompasses the geographic coordinates of the device. The first information may include check-in information input from the device, where the check-in information identifies a landmark at the location and identifies a time at which the device was at the landmark.

A system for retrieving images may include identifying locations at which a device was present and corresponding times at which the device was present at the locations; searching one or more network servers for images having metadata that corresponds to the locations and times; retrieving versions of the images from the one or more network servers; presenting the versions of the images for approval; and sending images that have been approved to a computing device. The features described herein, or portions thereof, may be incorporated into the foregoing system, examples of which are as follows.

All locations may be identified by geographic coordinates, and the metadata that corresponds to the locations and times includes geographic coordinates that are within a predefined range of geographic coordinates of the device. The versions of the images may be thumbnails of the images.

The system may include searching the one or more network servers for candidate images that have subject matter that substantially matches predefined subject matter. The candidate images may be searched for images having metadata that corresponds to the locations and times.

The system may include performing a recognition process on one or more of the stored images in an attempt to recognize a subject in the one or more stored images.

The system may include arranging the images that have been approved into a chronological album or into a topical album.

Two or more of the features described in this disclosure, or portions thereof, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein is a system for retrieving images based on, e.g., metadata that specifies where and when the images were captured. In an example, the system includes identifying locations at which a mobile computing device (or simply, "mobile device"), e.g., a cellular telephone, was present and corresponding times at which the device was present at those locations. The system performs an online search of, e.g., one or more network servers, for images having metadata that corresponds to the locations and times, and retrieves versions of those images (e.g., thumbnail versions) from the one or more network servers. The versions of the images are presented to a user for approval. Images that have been approved are retrieved and stored, e.g., on a user's local computing device.

The foregoing system can be advantageous. For example, the system can be used to locate images that were captured at locations where a mobile device was present, and at times that the mobile device was at those locations. So, for example, if a mobile device was known to be present at a specific geographic coordinate (e.g., near the Eiffel Tower) at a particular day and a particular time, the system may search online for images that were captured on the same day, at near the same time, and at a nearby location. In this manner, a user may retrieve images that have a more personal connection to the user than stock images. The system can be useful, e.g., if a user takes a vacation and loses his or her camera and, thus, the images contained in that camera.

The system may be implemented if an owner of a mobile device, e.g., a cellular telephone, opts into a feature on the cellular telephone that provides locations where the cellular telephone was present, and the times that it was at those locations. A user may opt out of such a feature, in which case the mobile device will not keep such a record of locations and times and/or receive information regarding the locations and times. The foregoing process, however, can still be used if a person manually identifies particular locations and times at which that person was at those locations.

Figure 1:
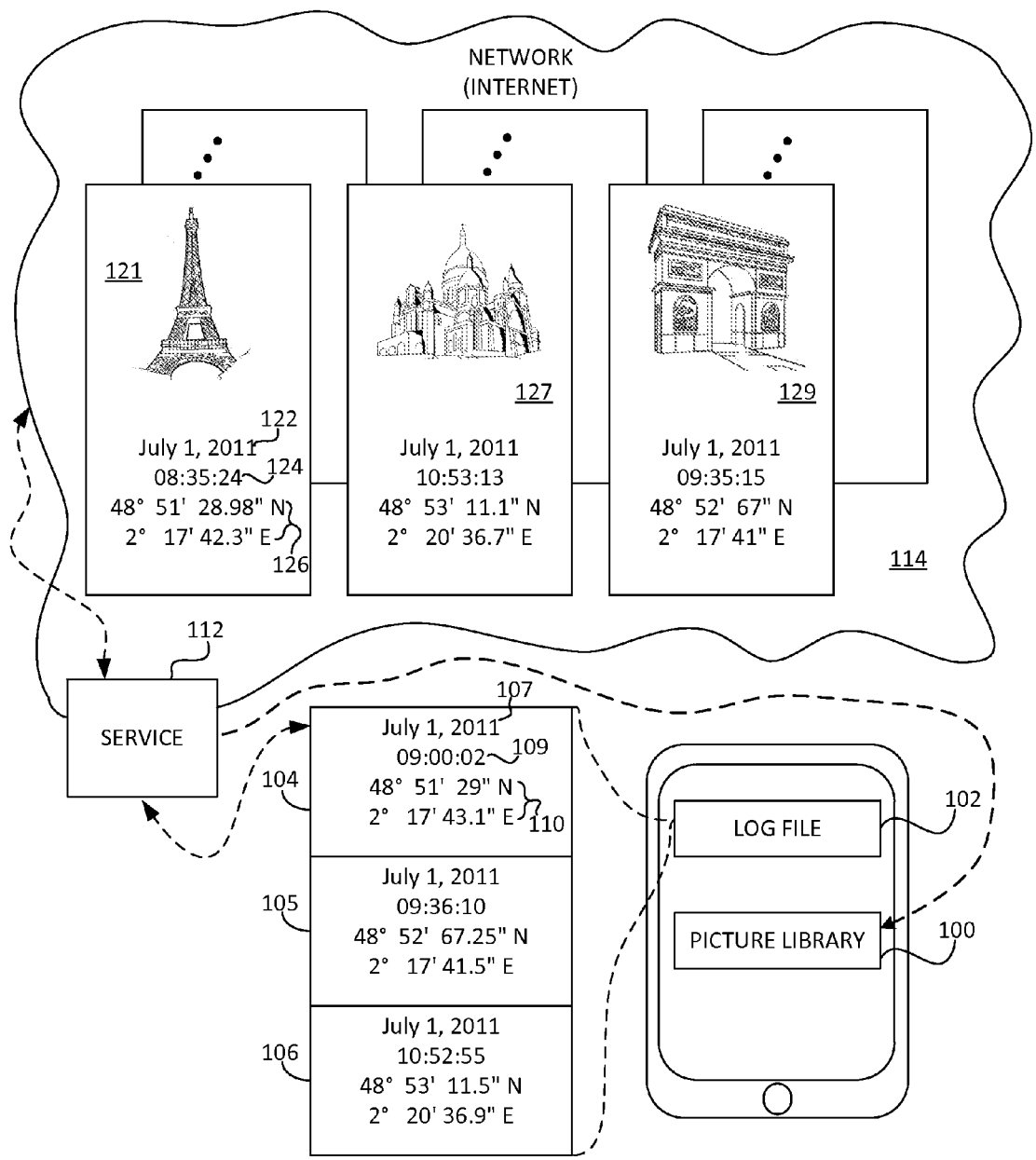
FIG. 1 is a conceptual view of an example process for retrieving images based on where and when those images were captured.

FIG. 1 shows, conceptually, how the foregoing system may operate. In the example of FIG. 1, the mobile device is a cellular telephone 100. Cellular telephone 100 may be a smartphone having a feature that enables the cellular telephone to maintain a log file containing a record of locations where the cellular telephone has been, and dates and times when the cellular telephone was at those locations. A user may opt into the feature or opt out of this logging feature. If the user opts out of the feature, cellular telephone 100 does not maintain the log file.

In some examples, a global positioning system (GPS), which is associated with cellular telephone 100, can maintain a log file 102 of geographic coordinates at specified intervals. These intervals may be on the order of seconds, minutes or hours, depending upon settings applied to the cellular telephone. The log file 102 may be maintained in memory on the cellular telephone, and may be accessible to the user for various reasons, including for performing the processes described herein. In an implementation, the log file is accessible to the user only, and cannot be obtained from the cellular telephone absent an affirmative act by the user and/or the user's consent.

In the example of FIG. 1, log file 102 includes entries 104 to 106. By way of example, each entry (e.g., 104) includes a date 107, a time 109, and geographic coordinates 110. The geographic coordinates 110 identify a geographic location of cellular telephone 100, and the corresponding date 107 and time 109 identify the time that cellular telephone 100 was at that geographic location corresponding to geographic coordinates 110. Appropriate other information may be included in each log entry, and will depend on the types of information that are available from the cellular telephone and GPS system.

A user of cellular telephone 100 may submit the log file, or a portion thereof, to a service (e.g., a Web-based service) 112 that is accessible over a network 114, e.g., the Internet. The service 112 may parse the log file 102, or portion thereof, that is submitted, in order to identity the date, the time, and the geographic coordinates of each entry of the log file. The service may use the date, the time, and the geographic coordinates to search network 114 for images having metadata that is within a range of the specified date, the time, and the geographic coordinates.

The range used by the service 112 may be predefined or set by the user on a case-by-case basis. Furthermore, the range may be a single range (for a single variable) or a combination of ranges (for multiple variables). For example, the range may specify a predefined radius around coordinates from the log file 102. The range may specify a number of minutes before and/or after the time from the log file. The range may specify a number of day(s) before and/or after the date in the log file. To the extent that the log file contains other information, the range may take variations in that information into account as well.

The search may identify one or more images corresponding to each log entry. For example, the search may compare the information from a log entry to metadata stored for various images, and identify candidate images whose metadata matches, or is similar to, the information from the log entry. Thumbnail versions of those images may be presented to a user, who may select which of those images to download, if any. The selected images may be downloaded to the user's local computing device. In the example of FIG. 1, the user's local computing device is cellular telephone 100, and the images are downloaded to the user's picture library 120. In other examples, the user's local computing device can be a computing device other than the user's cellular telephone. For example, a user may obtain a cellular telephone log file using their desktop computer, and may interact with the foregoing service 112 using their desktop computer.

By virtue of the foregoing process, a user can find and retrieve images that were captured at a location that the user visited and at about the same time as the user was there. So, in the example of FIG. 1, a user of cellular telephone 100 may obtain images taken of Parisian landmarks at about the same time that the user was at those landmarks. For example, log file 102 may be used to retrieve an image 121 of the Eiffel tower by virtue of appropriate similarities between the date 107 of the log entry 104 and the date 122 of the image, the time 109 of the log entry 104 and the time 124 of the image, and the geographic coordinates 110 of the log entry 104 and the geographic coordinates 126 of the image (e.g., all are within an acceptable predefined range). In a similar manner, log entry 106 may be used to retrieve an image 127 of the Sacre Coeur cathedral, and log entry 105 may be used to retrieve an image 129 of the Arc de Triomphe, and so on. As noted above, these images may be stored on the Internet (or other network), and retrieved through a search of their metadata performed using information in appropriate log file entries.

In an implementation where a user has opted out of the log file feature, the user may enter a date, time and geographic coordinates manually into service 112, and thereby obtain image(s) meeting the appropriate criteria.

In an example implementation, image recognition processes may be employed as part of service 112. For example, a user may submit an image of a subject to be searched, along with the log file information. Service 112 may perform image recognition processes on the submitted image and on the image(s) identified through its search to confirm that the correct image(s) are being identified and that correct versions thereof are being retrieved. Facial recognition processes may also be used in an attempt to identify people in the images identified using the log file information. For example, a user of a cellular telephone may take a picture of himself using a camera in the cellular telephone, and submit that image to the service. The service 112 may employ one or more facial recognition routines in an attempt to identify the user in the images identified using the log file information. Thumbnail versions of images containing the user may be flagged when the user is presented with images for download.

Check-in information may be used in addition to, or instead of, log file information to perform a search for relevant images. A check-in service may include a service by which a smartphone, or other device, user checks into an event or destination. Such a check-in service may provide a user with an option to share that user's check-in information. In a case that the user elects to share his check-in information (e.g., the identity of an event and a time at which the user was at the event), this information can be used by service 112 to locate images of interest to a user. For example, if a user checks into a Boston Red Sox game on Jul. 29, 2011 at 7:00PM, this information may be used (upon approval by the user) by service 112 to search for images that may be of interest to the user. This information may be used alone, or in combination with the foregoing log file information. For example, the log file information may be used to identify an area where the user was sitting and thereby further focus the online search for images taken from the perspective of that seating area.

The process described with respect to FIG. 1 may be implemented on an appropriate network, with appropriate devices and computing equipment.

Figure 2:
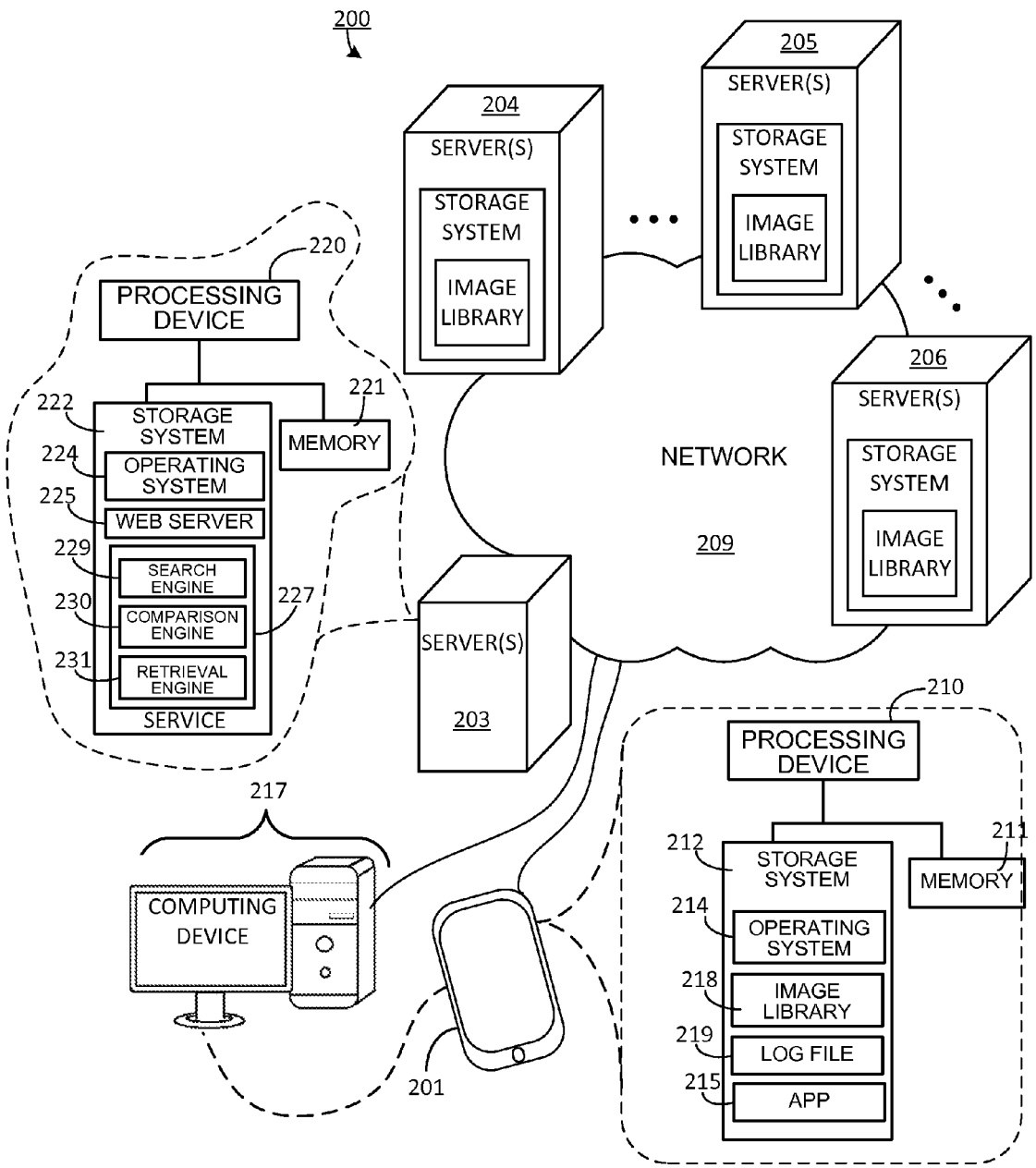
FIG. 2 is a block diagram of an example network and components that may be used to perform the process of FIG. 1.

FIG. 2 is a block diagram of an example of a system 200 on which the process depicted conceptually in FIG. 1 may be implemented. Mobile device 201 may be an example of the type of mobile device 100 used in FIG. 1. Mobile device 201 can be representative of various forms of mobile computing devices. Examples of mobile devices can include a cellular telephone, personal digital assistant (PDA), a tablet computer, and a smartphone. Mobile device 201 can communicate with servers 203 to 206 through network 209, which may include one or more networks.

Mobile device 201 may include one or more processing devices 210, memory 211, and a storage system 212. Storage system 212 can include an operating system (OS) 214, and an application ("app") 215 for initiating the image searching described herein. Storage system 212 also stores a log file 218 of the type described herein an image library 219.

Mobile device 201 may, or may not, interface to a computing device 217, which may contain software to initiate the image searching described herein. Computing device 217 may include one or more processing devices, and may be, or include, a laptop computer, a handheld computer, a tablet computer, a network appliance, a camera, an enhanced general packet radio service (EGPRS) mobile phone, a media player, a navigation device, an email device, a game console, or a combination of two or more of these data processing devices or other data processing devices. In some implementations, the computing device can be included as part of a motor vehicle (e.g., an automobile, an emergency vehicle (e.g., fire truck, ambulance), a bus). In some implementations, the computing device can be included as part of a desktop computer.

Computing device 217 includes one or more processing devices, memory and a storage system. Storage system can include an operating system (OS), and a Web browser for accessing the Internet.

Server 203 can represent various forms of servers, e.g., a web server, an application server, a proxy server, a network server, or a server farm. Server 203 can include one or more processing devices 220, memory 221 and a storage system 222. Storage system 22 can include an operating system (OS) 224 and a Web server program 215 to host a Web site for initiating the image searching described with respect to FIG. 1. Server 203 also stores computer program(s) for implementing an image searching service 227, which is an example of service 112 of FIG. 1. In this example, the computer programs include a search engine 229 for performing Internet (or other network) searches using information obtained from mobile device log files and/or check-in information, as described above. Comparison engine 230 obtains the search results from the search engine, and determines whether the search results are within a specified, acceptable range. For example, as described above, a determination may be made as to whether a particular image was captured within a time before or after a log file entry. Retrieval engine 231 obtains thumbnail and full size versions of the images that are selected by the comparison engine, and forwards those images to an appropriate user computing device. Comparison engine 230 and retrieval engine 231 may be part of (e.g., modules and routines of), or separate from, search engine 229.

Each of servers 204 to 206 can represent various forms of servers, e.g., a web server, an application server, a proxy server, a network server, or a server farm. Each server may include a storage system that stores an image library. The image library of each server stores images tagged with metadata. The images may be part of Web sites hosted by those servers, or otherwise uploaded by users (e.g., as in the case of a file server). As explained above, the metadata may specify a device that captured an image, the date that the image was captured, the time that the image was captured, and the location, e.g., geographic coordinates, at which the image was captured. Other information may also be included within the metadata. Each of servers 204 to 206 is accessible through network 209 (e.g., the Internet) using a Web browser or appropriate Web services.

Network 209 can represent a communications network that can allow devices (e.g., mobile device 201) to communicate wirelessly through a communication interface (not shown), which may include digital signal processing circuitry where necessary. Network 209 can include one or more networks available for use by the devices 201 and 217 for communication with server 203. The network(s) may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, or other such transceiver.

Figure 3:
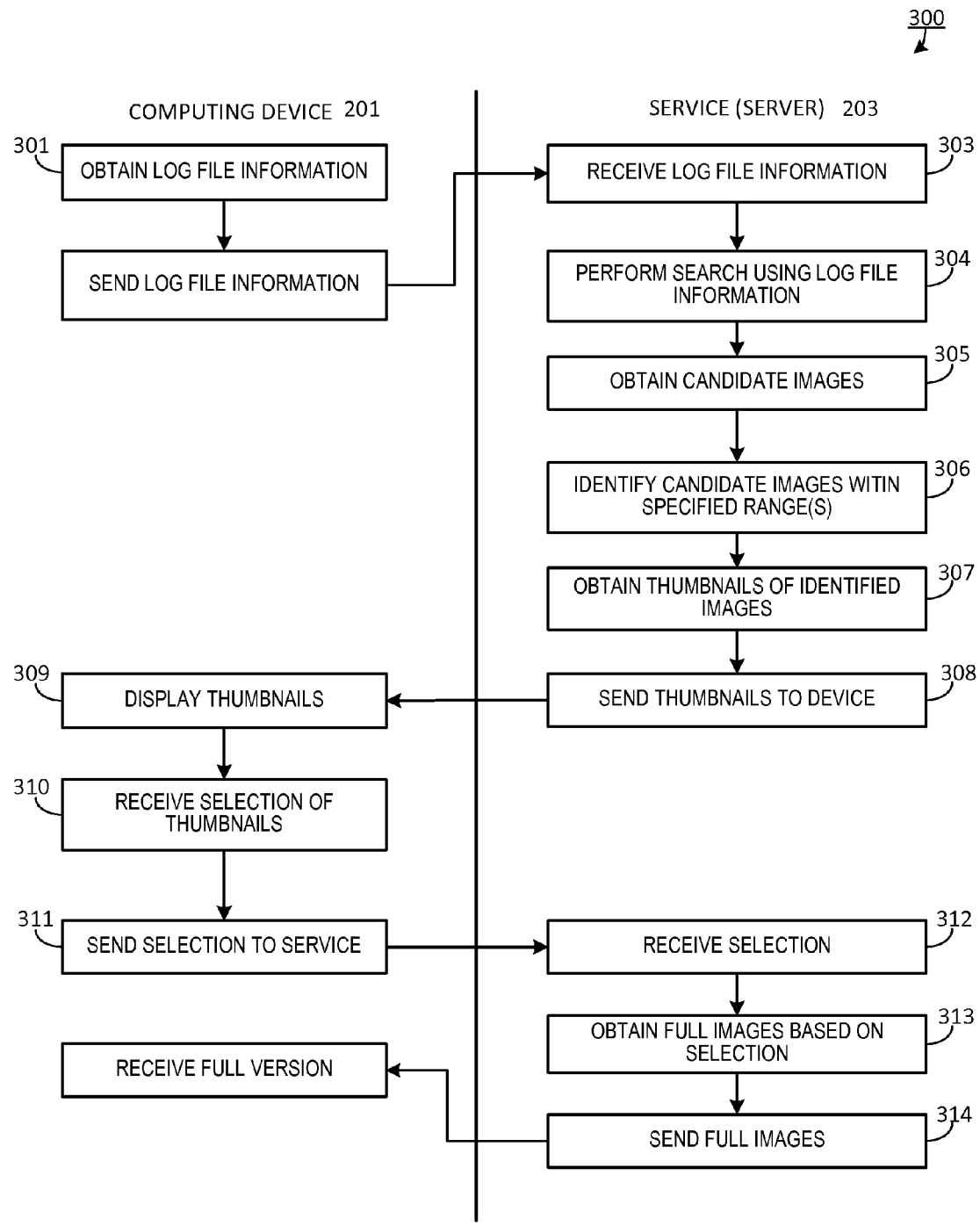
FIG. 3 is a flowchart showing an example of the process of FIG. 1.

FIG. 3 is a flowchart showing a process 300, an example of which is described conceptually with respect to FIG. 1, which may be performed on the system shown in FIG. 2. At least part of process 300 may be performed using app 215 that is downloaded from server 203 (or from other appropriate location) or by accessing a Web site hosted by server 203.

In operation, a computing device, e.g., mobile device 201, obtains (301) a log file containing, e.g., a record of locations where the mobile device has been, and dates and times when the mobile device was at the corresponding locations. The record of locations where the mobile device has been may be expressed in geographic coordinates or other appropriate identification information. The log file may be maintained and stored on the same device that performs the process of FIG. 3, or it may be obtained from a separate mobile device.

In accordance with process 300, information from the log file (log file information) may be obtained (301) by parsing the log file. This may be done either by mobile device 201 or service 227. For example, the log file may be stored in a machine-readable mark-up language, e.g., eXtensible Markup Language (XML), which can be parsed by appropriate computer-implemented processes. In this example, the log file information is obtained and sent (302) to service 227 running on server 203, along with an instruction to perform a search for online images having metadata that corresponds to the log file information (e.g., a record of locations where the mobile device has been, and dates and times at those locations).

Service 227 receives (303) the log file information and, using search engine 229 performs a search (304) of network 209 for images having metadata that corresponds to the received log file information. In an example, the search may identify images having metadata that matches, or is close to, the locations, dates and/or times obtained from the log file. The resulting identified images constitute candidates for retrieval. Service 227 obtains (305) these candidate images and identifies (306) which, if any, of these candidate images are within range(s) specified, e.g., by a user requesting the search or that are pre-specified by the search service. For example, a range may specify that images captured within one hour of a specified time and within a radius of 50 feet are acceptable. In this regard, appropriate ranges for dates, times and distance may be used.

Service 227 uses comparison engine 230 to compare the metadata associated with the candidate images to appropriate information obtained from the log file. Candidate images having metadata within the specified range are thereby identified (306) for output to mobile device 201. In this example, retrieval engine 231 obtains (307) thumbnail versions of those candidate images (e.g., from a server 204 to 206 or elsewhere on the network), and sends (308) those thumbnail versions to mobile device 201.

Mobile device 201 receives and displays (309) the thumbnail versions. Mobile device 201 receives (310) user selections of the thumbnail versions and sends (311) those selections to server 203. Service 227 receives (312) the selections, obtains (313) full versions of the images, and sends (314) the full versions to mobile device 201. Mobile device 201 receives (315) the full versions, and stores and/or displays them on its display screen.

Implementations of process 300 may include additional features and/or features that are different than those described above. For example, process 300 may receive, along with the log file information or at another time, an image that is to be part of the search. In an example, the image may be an image of a landmark (e.g., the Eiffel tower) or other subject that is associated with the search. Process 300 may perform an image recognition process on the received images and on the candidate images to confirm that the images are relevant to the search. Images that are relevant to the search may be designated as candidate images, and images that are not relevant may be disregarded.

In another example implementation, the image received may be of a person. For example, a user may wish to attempt to identify images posted online that include the user. Process 300 may perform a facial recognition process on the received image and on candidate images in order to identify which, if any, of those candidate images include the person depicted in the received image. Thumbnail versions of such images may be flagged at the computing device.

In another example implementation, check-in information may be substituted for, or may augment, the log file information received (303) by service 227. More specifically, some social networking services allow a user to check-in to a location, e.g., an event. This information may be stored, e.g., on the user's mobile computing device in which the check-in occurred, or the information may be available, with the user's permission, from the user's account. The check-in information may, or may not, contain geographic coordinates. In an example, the check-in information may simply identify an event or site (e.g., a Red Sox game) and the time at which the user checked-in using their mobile device. This information alone may be used to perform the search (304). If additional information, e.g., geographic coordinates is available, that information may be used to augment the check-in information when searching (304). This additional information may be used to identify, with greater specificity, where the user was when checked-in (e.g., where the user was seated).

Process 300 may be used to generate an album of images. By way of example, information from a log file of a computing device may contain numerous times and geographic coordinates (see, e.g., FIG. 1). This information may be used to retrieve multiple images corresponding to places that the mobile device has visited. The images retrieved according to process 300 may be downloaded into the device's picture library, for example, and stored as an album of images. The images may be ordered in the album by time and/or date or by geographic location. As such, the album may be chronological or topical. For example, if a user with the device visited the Eiffel Tower multiple times on their trip to Paris, Eiffel Tower pictures may be grouped in the album. Alternatively, the images may be grouped based on when the user visited those sites.

Figure 4:
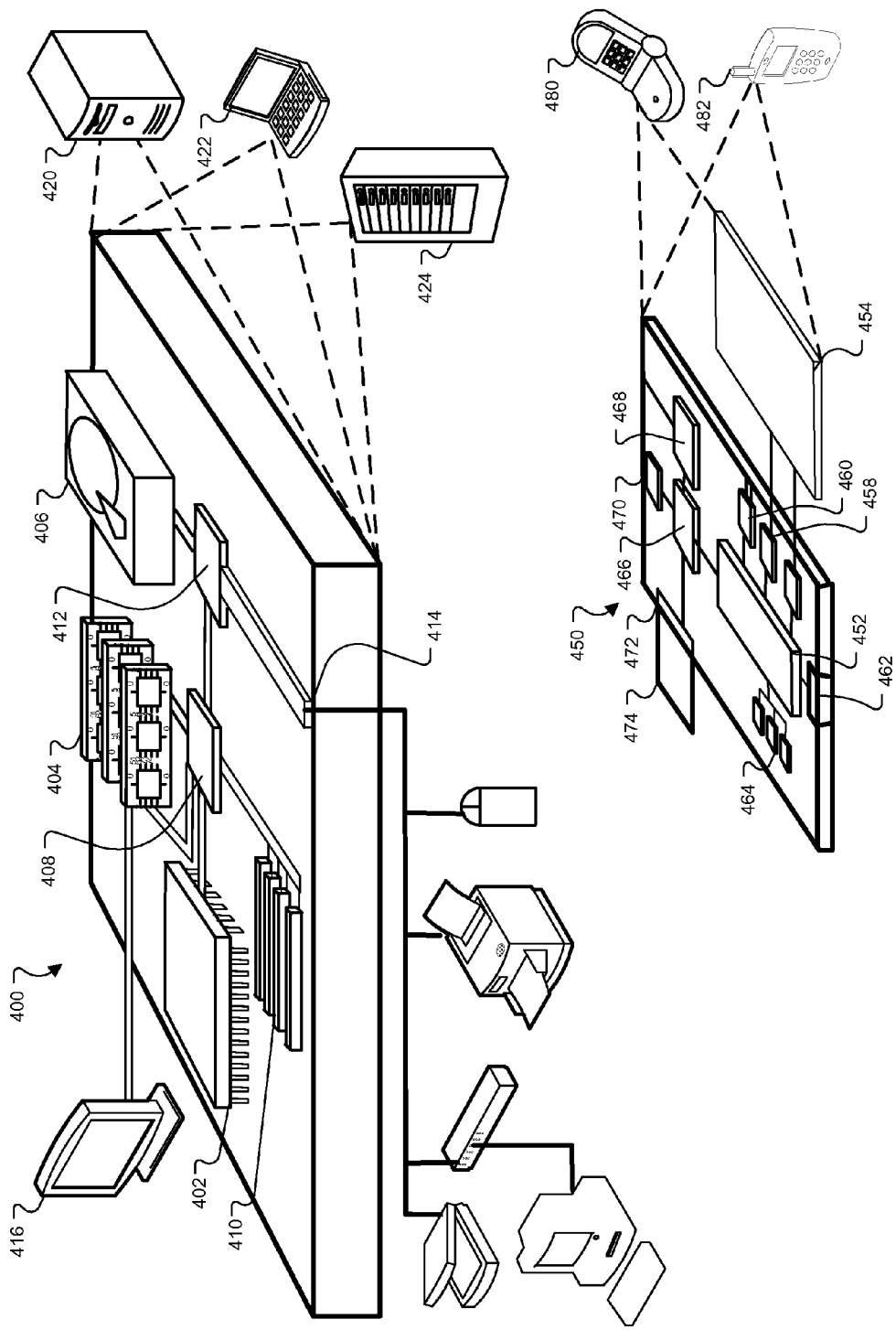
FIG. 4 shows examples of computer devices that may be used to perform the process, or elements thereof, depicted in FIGS. 1 to 3.

FIG. 4 shows an example of a generic computer device 400 and a generic mobile computer device 450, which may be used to implement the process and variations thereto described herein, including the mobile device-side actions, the computing device-side actions, and server-side actions. Computing device 400 is intended to represent various forms of digital computers, e.g., laptops, desktops, workstations, personal digital assistants, servers, blade servers, mainframes, and other appropriate computers. Computing device 450 is intended to represent various forms of mobile devices, e.g., personal digital assistants, cellular telephones, smartphones, tablets and other similar computing devices. The components shown here, their connections and relationships, and their functions, are meant to be exemplary only, and are not meant to limit the claims appended to this document.

Computing device 400 is intended to represent various forms of digital computers, e.g., laptops, desktops, workstations, personal digital assistants, servers, blade servers, mainframes, and other appropriate computers. Computing device 450 is intended to represent various forms of mobile devices, e.g., personal digital assistants, cellular telephones, smartphones, and other similar computing devices. The components shown here, their connections and relationships, and their functions, are meant to be exemplary only, and are not meant to limit the claims appended to this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, for example, display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, examples of which include a magnetic or optical disk.

The storage device 406 is capable of providing mass storage for the computing device 400. In one implementation, the storage device 406 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 404, the storage device 406, memory on processor 402. For example, the information carrier may be a non-transitory, machine-readable storage medium.

The high speed controller 408 manages bandwidth-intensive operations for the computing device 400, while the low speed controller 412 manages lower bandwidth-intensive operations. Such allocation of functions is an example. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer, for example, a laptop computer 422. Alternatively, components from computing device 400 may be combined with other components in a mobile device (not shown), for example, device 450. Each of such devices may contain one or more of computing device 400, 450, and an entire system may be made up of multiple computing devices 400, 450 communicating with each other.

Computing device 450 includes a processor 452, memory 464, an input/output device for example, a display 454, a communication interface 466, and a transceiver 468, among other components. The device 450 may also be provided with a storage device, for example, a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, for example, control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 464, expansion memory 474, memory on processor 452.

Device 450 may communicate wirelessly through communication interface 466, which may include digital signal processing circuitry where necessary. Communication interface 466 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, for example, using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, for example, through a speaker, e.g., in a handset of device 450.

Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

For situations in which the systems discussed here collect personal information (e.g., location) about users, the users may be provided with an opportunity to opt in/out of programs or features that may collect the personal information. In addition, certain data may be anonymized in one or more ways before it is stored or used, so that personally identifiable information is removed. For example, a user's identity may be anonymized so that the no personally identifiable information can be determined for the user and so that identified user preferences or user interactions are generalized (for example, generalized based on user demographics) rather than associated with a particular user. Finally, information stored in the logs may be deleted after a period of time.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The processes described herein are not limited to the protocols described herein. For example, other communication protocols may be substituted for HTTP. For example, HTTPS, TCP, UDP, or IP communications may be used in place of HTTP communications.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
    receiving at a network server first information about a first device, the first information comprising a log recorded by the first device at a recording time interval of a plurality of locations where the first device was present and a respective time that the first device was present at each of the plurality of locations, the first information further comprising a time range and a distance range;
    searching, by the network server, for images having location metadata within the distance range of each of the plurality of locations in the log and time metadata within the time range of the respective times;
    identifying at the network server candidate image associated with a second device other than the first device, the candidate image associated with second information comprising data corresponding to a location at which the candidate image was captured and a time at which the candidate image was captured, the location at which the candidate image was captured being within the distance range of one of the plurality of locations of the first device and the time at which the candidate image was captured being within the time range of the respective time at which the first device was at the one of the plurality of locations;

sending by the network server to a third device other than the first device or the second device a lower resolution version of the candidate image associated with the second information for approval;

receiving an approval of the lower resolution version of the candidate image;

sending a full resolution version of the candidate image that was approved to the third device in response to the approval.

2. The method of claim 1, further comprising:
performing a facial recognition process on the candidate image to identify a subject appearing in the candidate image.

3. The method of claim 1, wherein the first information further comprises check-in information input from the device, the check-in information identifying a landmark at a location and identifying a time at which the device was at the landmark.

4. The method of claim 1, wherein the first information is recorded upon selection of an option to enable location logging.

5. The method of claim 1, further comprising arranging the full resolution version of the candidate image that was approved into a chronological album.

6. The method of claim 1, further comprising arranging the full resolution version of the candidate image that was approved into a topical album.

7. A method comprising:
storing a time range, a distance range, and a log recorded by a first device at a recording time interval, the log comprising a plurality of locations at which the first device was present and corresponding times at which the first device was present at each of the plurality of locations;
searching one or more network servers for a candidate image associated with a second device other than the first device, the candidate images having metadata comprising a location at which the candidate image was captured and a time at which the candidate image was captured, the location at which the candidate image was captured within the distance range of one of the plurality of locations stored in the log and the time at which the candidate image was captured being within the time range of the corresponding times at which the device was present at the one of the plurality of locations;
identifying a candidate image as a result of the search;
retrieving a lower-resolution version of the candidate image associated with the second device from the one or more network servers;
sending the lower-resolution version of the candidate image to a third device other than the first device and the second device for approval; and
upon receiving approval, sending a full resolution version of the candidate image that was approved.

8. The method of claim 7, further comprising: searching the one or more network servers for a candidate images that has subject matter that substantially matches predefined subject matter.

9. The method of claim 7, further comprising: performing a recognition process on the candidate image in an attempt to recognize a subject in the candidate image.

10. The method of claim 7, further comprising: arranging the full resolution version of the approved candidate image into a chronological album.

11. The method of claim 7, further comprising: arranging the full resolution version of the approved candidate image into a topical album.

12. The method of claim 7, wherein the log is recorded upon selection of an option to enable location logging.

13. One or more non-transitory machine-readable media storing instructions that are executable to perform operations comprising:
receiving at a network server first information about first device, the first information comprising a log recorded by the first device at a recording time interval of a plurality of locations where the first device was present and a respective time that the first device was present at each of the plurality of locations, a time range, and a distance range;
searching, by the network server, for images having location metadata within the distance range of each of the plurality of locations and time metadata within the time range of each of the respective times;
identifying at the network server candidate image associated with a second device other than the first device, the candidate image associated with second information comprising data corresponding to a location at which the candidate image was captured and a time at which the candidate image was captured, the location at which the candidate image was captured being within the distance range of one of the plurality of locations of the first device and the time at which the candidate image was captured being within the time range of a time at which the first device was at the one of the plurality of locations of the first device;
sending by the network server to a third device other than the first device or the second device a lower resolution version of the candidate image associated with the second information for approval;
receiving an approval of the lower resolution version of the candidate image; and
sending a full resolution version of the candidate images to the third device in response to the approval.

14. The non-transitory machine-readable media of claim 13, further storing instructions that are executable to perform operations comprising arranging the full resolution version of the image that was approved into a chronological album.

15. One or more non-transitory machine-readable media storing instructions that are executable to perform operations comprising:
receiving by a network server first information about a first device, the first information comprising a log recorded at a recording time interval of a plurality of locations at which the first device was present and a corresponding time at which the first device was present at each of the plurality of locations, the first information further comprising a time range and a distance range;
searching one or more network servers for a candidate image associated with a second device other than the first device and having metadata comprising a location at which the candidate image was captured and a time at which the candidate image was captured, the location at which the candidate image was captured within the distance range of one of the plurality of locations at which the first device was present and the time at which the candidate image was captured within the time range of a corresponding time at which the first device was present at the one of the plurality of locations;

sending from the one or more network servers to a third device other than the first device or the second device a lower-resolution version of the candidate image for approval;

receiving an approval of the lower resolution version of the candidate image; and sending in response to receiving approval a full resolution version of the candidate image to the third device.

16. The non-transitory machine-readable media of claim 15, wherein the log is recorded upon selection of an option to enable location logging.

17. The non-transitory machine-readable media of claim 15, further storing instructions that are executable to perform operations comprising arranging the full resolution version of the candidate image that was approved into a topical album.

18. A system comprising:
one or more processing devices coupled to a nontransitory computer readable medium having code stored thereon that, when executed by the one or more processing devices, causes the one or more processing devices to provide:
a search engine to receive from a first device first information about the first device, the first information comprising a time range, a distance range, and a log recorded at the first device at a recording time interval comprising a log of a plurality of locations where the first device was present and a respective time& at which the first device was present at each of the plurality of locations;
a comparison engine to identify a candidate image associated with a second device other than the first device, the candidate image associated with second information comprising a location at which the candidate image was captured and a time at which the candidate image was captured, the location at which the candidate image was captured being within the distance range of one of the plurality of locations of the first device and the time at which the candidate image was captured being within the time range of a respective time at which the first device was at the one of the plurality of locations;
a retrieval engine to retrieve a lower-resolution version of the candidate image associated with the second information;
a presentation engine to send the lower-resolution version of the candidate image to a third device other than the first device or the second device for approval; and
a transmission engine to send a full resolution version of the candidate image to a computing device.

19. A system comprising:

memory to store code for a search engine; and one or more processing devices to execute the code to perform operations comprising:
receiving at a network server first information about a first device, the first information comprising a distance range, a time range, and a log recorded at the first device at a recording time interval, the log comprising a plurality of locations at which the first device was present and a corresponding time at which the device was present at each of the plurality of locations;

searching one or more network servers for a candidate image associated with a second device other than the first device, the candidate image having metadata comprising a location at which the candidate image was captured and a time at which the candidate image was captured, the location at which the candidate image was captured being within the distance range of one of the plurality of locations of the first device and the time at which the image was captured being within the time range of a corresponding time at which the first device was at the one of the plurality of locations;

sending a lower-resolution version of the candidate image to a third device other than the first device or the second device for approval;

receiving an approval of the lower-resolution version of the candidate image; and in response to the approval, sending a full resolution version of the candidate image to a computing device.

20. The system of claim 19, the operations further comprising arranging the full resolution version of the candidate image that was approved into a chronological album.

* * * * *